(12) United States Patent
Okubo

(10) Patent No.: US 11,551,457 B2
(45) Date of Patent: Jan. 10, 2023

(54) VEHICLE EXTERNAL ENVIRONMENT RECOGNITION APPARATUS

(71) Applicant: SUBARU CORPORATION, Tokyo (JP)

(72) Inventor: Toshimi Okubo, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 17/461,266

(22) Filed: Aug. 30, 2021

(65) Prior Publication Data

US 2022/0067396 A1 Mar. 3, 2022

(30) Foreign Application Priority Data

Aug. 31, 2020 (JP) .............................. JP2020-145453

(51) Int. Cl.
*G06V 20/56* (2022.01)
*G06V 20/64* (2022.01)

(52) U.S. Cl.
CPC .............. *G06V 20/56* (2022.01); *G06V 20/64* (2022.01)

(58) Field of Classification Search
CPC ...... G06V 20/56; G06V 20/64; G06V 10/507; G06V 20/58; G06V 20/588; G06V 10/25; G06V 10/764; G06V 10/82; G06V 10/255; G06V 10/758; G06V 40/10; G06V 10/273; G06V 10/75; G06V 10/16; G06V 10/26; G06V 40/20; G06V 10/443; G06V 10/22; G06V 2201/08; G06V 20/54; G06V 10/24; G06V 10/48; G06V 10/7515; G06V 10/752; G06V 10/759; G06V 10/751; G06V 10/454; G06V 10/20; G06V 10/449; G06V 30/194; G06V 20/52; G06V 20/582; G06V 20/647; G06V 40/103; G06V 40/161; G06V 40/19; G06T 2207/30261; G06T 2207/30252; G06T 2207/30256;
(Continued)

(56) References Cited

U.S. PATENT DOCUMENTS

| 5,904,725 A * | 5/1999 | Iisaka ..................... G01C 21/28 701/28 |
| 2018/0137339 A1* | 5/2018 | Osato ......................... G06T 1/00 |
| 2019/0001910 A1* | 1/2019 | Motohashi ............. G06V 20/56 |

FOREIGN PATENT DOCUMENTS

JP          3349060 B2    11/2002

* cited by examiner

*Primary Examiner* — Nimesh Patel
(74) *Attorney, Agent, or Firm* — McDermott Will & Emery LLP

(57) ABSTRACT

A vehicle external environment recognition apparatus to be applied to a vehicle includes a road surface determination processor and a three-dimensional object determination processor. The road surface determination processor determines a road surface region that corresponds to a road surface in an image, plots representative distances of respective horizontal lines in the road surface region at respective vertical positions of the horizontal lines, and generates first and second road surface models. The second road surface model represents a farther portion of the road surface region from the vehicle than the first road surface model and differs in a gradient from the first road surface model. On a condition that an angle formed by the first and second road surface models is greater than a predetermined angle, the three-dimensional object determination processor cancels the second road surface model and extends far the first road surface model.

3 Claims, 11 Drawing Sheets

(58) Field of Classification Search
CPC ... G06T 2207/10016; G06T 7/00; G06T 7/70; G06T 7/593; G06T 7/11; G06T 7/73; G06T 1/00; G06T 2207/10028; G06T 7/12; G06T 7/13; G06T 7/246; G06T 7/74; G06T 2207/10024; G06T 2207/20084; G06T 5/50; G06T 2207/20021; G06T 7/254; G06T 7/50; G06T 2207/20081; G06T 2207/10012; G06T 2207/20221; G06T 2207/30196; G06T 7/0012; G06T 2207/30236; G06T 2200/04; G06T 3/4038; G06T 2207/30244; G06T 15/00; G06T 15/10; G06T 2207/20101; G06T 17/00; G06T 19/20; G06T 2207/30248; G06T 2210/56; G06T 7/149; G06T 7/20; G06T 7/215; G06T 7/248; G06T 7/66; G06T 7/77; G06T 19/00; G06T 9/002; G06T 19/003; G06T 2207/20016; G06T 2207/20076; G06T 2207/30232; G06T 7/10; G06T 7/277; G06T 7/344; G06T 7/62; G06N 20/00; G06N 3/0454; G06N 3/08; G06N 3/084; G06N 3/0472; G06N 3/006; G06N 3/02; G06N 5/048; G06N 7/005; G06N 7/023; G06N 3/063; G06N 3/04; G06N 20/10; G06K 9/6218; G06K 9/6256; G06K 9/6201; G06K 9/6262; G06K 9/6267; G06K 9/6292; G06K 9/62; G06K 9/6268; G06K 9/6277; G06K 9/00536; G06K 9/6293; G06K 9/627; G08G 1/04; G08G 1/0125; G08G 1/0175; G08G 1/054; G08G 1/16; G08G 1/167; G08G 1/052; G08G 1/056; G08G 1/0962; G08G 1/0969; G08G 5/0086; G08G 1/165; G08G 1/166; G08G 5/045; G08G 3/02; B60R 1/00; B60R 2300/30; B60R 21/01538; B60R 21/01534; B60R 2300/8066; B60R 1/04; B60R 2001/1215; B60R 2001/1253; B60R 2021/01325; B60R 2021/01327; B60R 2300/8093

See application file for complete search history.

VEHICLE EXTERNAL ENVIRONMENT RECOGNITION APPARATUS

CROSS-REFERENCE TO RELATED APPLICATIONS

This application claims priority from Japanese Patent Application No. 2020-145453 filed on Aug. 31, 2020, the entire contents of which are hereby incorporated by reference.

BACKGROUND

The technology relates to a vehicle external environment recognition apparatus that identifies a three-dimensional object.

Japanese Patent No. 3349060 discloses a technique that includes detecting three-dimensional objects, e.g., a preceding vehicle, in front of an own vehicle to reduce an influence of contact with the preceding vehicle and a technique that includes making a following control to keep a safe distance from the preceding vehicle.

SUMMARY

An aspect of the technology provides a vehicle external environment recognition apparatus to be applied to a vehicle. The vehicle external environment recognition apparatus includes a road surface determination processor and a three-dimensional object determination processor. The road surface determination processor is configured to determine a road surface region that corresponds to a road surface in an image, plot representative distances of respective horizontal lines in the road surface region at respective vertical positions of the horizontal lines, and generate a first road surface model and a second road surface model. The second road surface model represents a farther portion of the road surface region from the vehicle than the first road surface model and differs in a gradient from the first road surface model. The three-dimensional object determination processor is configured to group blocks to put any two or more of the blocks that are positioned vertically upward of the first road surface model and the second surface model in a group and thereby determine a three-dimensional object. On the condition that an angle formed by the first road surface model and the second road surface model is greater than a predetermined angle, the three-dimensional object determination processor is configured to cancel the second road surface model and extend far the first road surface model.

An aspect of the technology provides a vehicle external environment recognition apparatus to be applied to a vehicle. The vehicle external environment recognition apparatus includes circuitry. The circuitry is configured to determine a road surface region that corresponds to a road surface in an image, plot representative distances of respective horizontal lines in the road surface region at respective vertical positions of the horizontal lines, and generate a first road surface model and a second road surface model. The second road surface model represents a farther portion of the road surface region from an own vehicle than the first road surface model and differs in a gradient from the first road surface model. The circuitry is configured to group blocks to put any two or more of the blocks that are positioned vertically upward of the first road surface model and the second surface model in a group and thereby determine a three-dimensional object. On the condition that an angle formed by the first road surface model and the second road surface model is greater than a predetermined angle, the circuitry is configured to cancel the second road surface model and extend far the first road surface model.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

DETAILED DESCRIPTION

Figure 1:
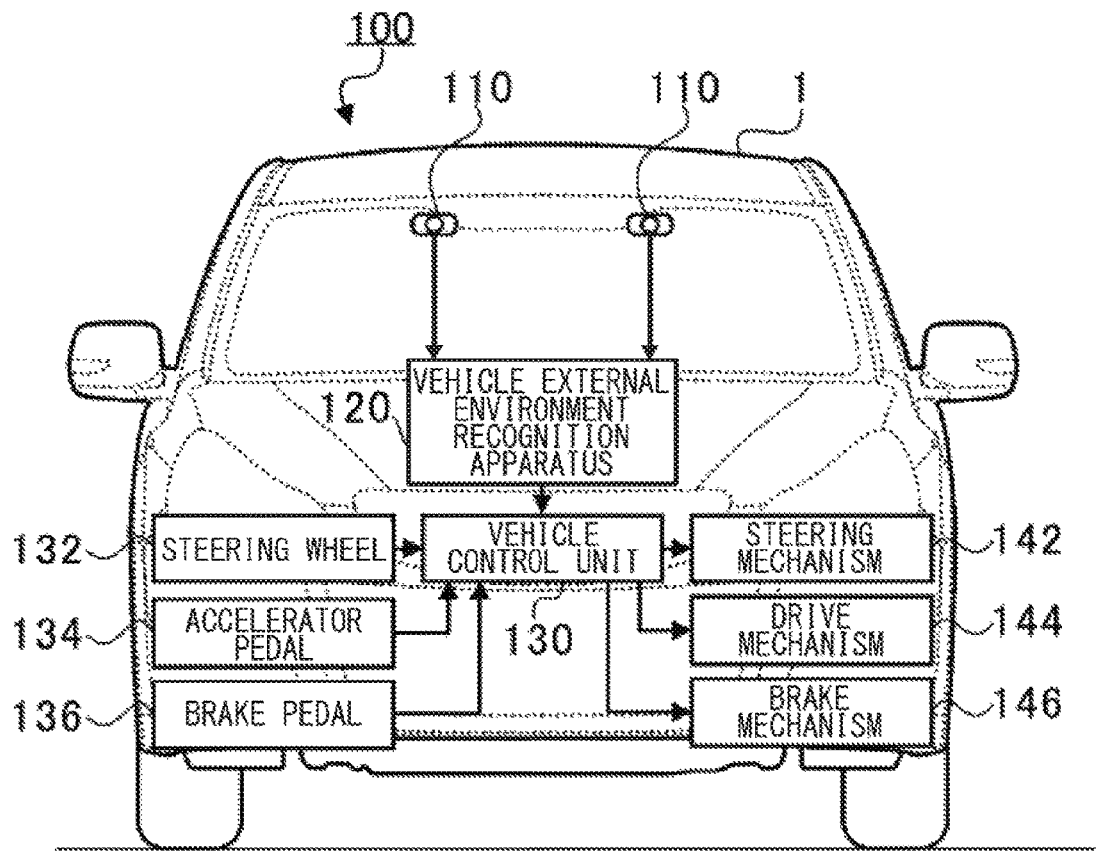
FIG. 1 is a block diagram illustrating an example of a coupling relationship in a vehicle external environment recognition system.

There are three-dimensional objects present in a traveling direction of an own vehicle, e.g., preceding vehicles and on-coming vehicles. Preceding vehicles travel in the same direction as the own vehicle, while on-coming vehicles travel in an opposite direction to the own vehicle. The own vehicle extracts three-dimensional objects in a case where a presumed three-dimensional object satisfies a condition that the presumed three-dimensional object has a height vertically upward from a road surface. It follows therefore that the own vehicle has to determine a road surface appropriately. In a case where an own vehicle fails in determining a road surface appropriately, the own vehicle may fail in extracting a three-dimensional object that is actually present, or may end up identifying a road surface with a gradient as a three-dimensional object.

It is desirable to provide a vehicle external environment recognition apparatus that makes it possible to determine a road surface appropriately.

Some example embodiments of the technology will now be described in detail with reference to the accompanying drawings. Note that sizes, materials, specific values, and any other factors illustrated in respective example embodiments are illustrative for easier understanding of the technology, and are not intended to limit the scope of the technology unless otherwise specifically stated. Further, elements in the following example embodiments which are not recited in a most-generic independent claim of the technology are optional and may be provided on an as-needed basis. Throughout the present specification and the drawings, elements having substantially the same function and configuration are denoted with the same reference numerals without any redundant description. Further, elements that are not directly related to the technology are not illustrated in the drawings. The drawings are schematic and are not intended to be drawn to scale.

[Vehicle External Environment Recognition System 100]

FIG. 1 is a block diagram illustrating a coupling relationship in a vehicle external environment recognition system 100. The vehicle external environment recognition system 100 may be provided in an own vehicle 1. The vehicle external environment recognition system 100 may include, for example but not limited to, imaging units 110, a vehicle external environment recognition apparatus 120, and a vehicle control unit 130.

The imaging units 110 may each include an imaging device such as a charge-coupled device (CCD) or a complementary metal-oxide semiconductor (CMOS). For example, two imaging units 110 may be disposed to be away from each other in a substantially horizontal direction in such a manner that optical axes of the respective imaging units 110 are substantially parallel to each other and are each parallel to a traveling direction of the own vehicle 1. The imaging units 110 may each perform imaging of an external environment in front of the own vehicle 1, and generate a luminance image that includes at least luminance information. The luminance image may be a color image or a monochrome image. The imaging units 110 may each continuously generate the luminance images of three-dimensional objects present in a detection region in front of the own vehicle 1 for each frame of 1/60 seconds, i.e., at a frame rate of 60 fps, for example. Non-limiting examples of the three-dimensional object and an identification object to be recognized by the vehicle external environment recognition apparatus 120 may include an independently present object and an object identifiable as a portion of the independently present object. Non-limiting examples of the independently present object may include a bicycle, a pedestrian, a vehicle, a traffic light, a road sign, a guardrail, a building, and a sidewall at the roadside. Non-limiting examples of the object identifiable as a portion of the independently present object may include a rear surface of a vehicle, a side surface of a vehicle, and a wheel of a bicycle. As used herein, the "rear surface of a vehicle" refers to a surface, of another vehicle in front of the own vehicle 1, opposed to the own vehicle 1 and does not refer to a back surface of the relevant vehicle itself.

The vehicle external environment recognition apparatus 120 may acquire the luminance images from the two respective imaging units 110, and generate distance images by so-called pattern matching. The vehicle external environment recognition apparatus 120 may group blocks on the basis of the luminance images and the distance images. The vehicle external environment recognition apparatus 120 may put any two or more blocks that are located above a road surface, have the same color value, and have respective pieces of three-dimensional position information that are adjacent to each other in a group as a three-dimensional object. Further, the vehicle external environment recognition apparatus 120 may determine which kind of identification object the three-dimensional object is. For example, the vehicle external environment recognition apparatus 120 may identify the three-dimensional object as a preceding vehicle. Upon identifying the preceding vehicle, the vehicle external environment recognition apparatus 120 may perform a control of reducing an influence of contact between the own vehicle 1 and the preceding vehicle, or may perform a following control of causing the own vehicle 1 to follow the preceding vehicle. Examples of operation of the vehicle external environment recognition apparatus 120 will be described later in detail.

The vehicle control unit 130 may include, for example but not limited to, an electronic control unit (ECU). The vehicle control unit 130 may receive input of operation performed by an occupant such as a driver via devices including, without limitation, a steering wheel 132, an accelerator pedal 134, and a brake pedal 136, and transmit the information of the input to mechanisms including, without limitation, a steering mechanism 142, a drive mechanism 144, and a brake mechanism 146, thereby controlling the own vehicle 1. Further, the vehicle control unit 130 may control each of the steering mechanism 142, the drive mechanism 144, and the brake mechanism 146 in accordance with an instruction given by the vehicle external environment recognition apparatus 120.

[Vehicle External Environment Recognition Apparatus 120]

Figure 2:
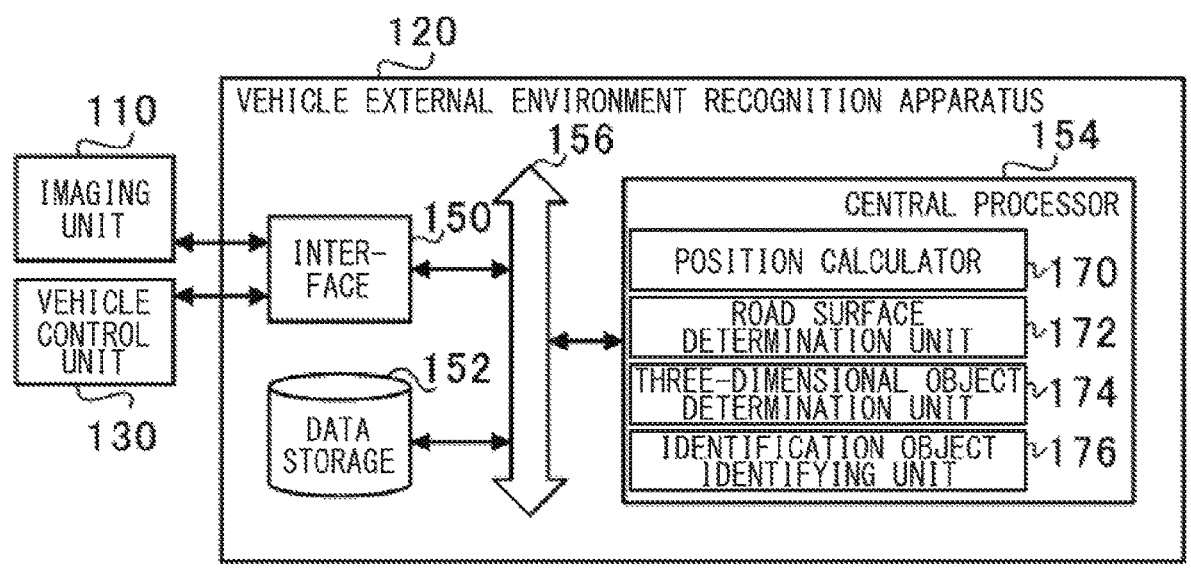
FIG. 2 is a block diagram illustrating an example of a schematic configuration of a vehicle external environment recognition apparatus.

FIG. 2 is a block diagram illustrating an example of a schematic configuration of the vehicle external environment recognition apparatus 120. As illustrated in FIG. 2, the vehicle external environment recognition apparatus 120 may include an interface 150, a data storage 152, and a central processor 154.

The interface 150 may allow for bi-directional information exchange between the vehicle external environment recognition apparatus 120 and each of the imaging unit 110 and the vehicle control unit 130. The data storage 152 may include a device such as a random-access memory (RAM), a flash memory, or a hard disk drive (HDD). The data storage 152 may store various pieces of information necessary for processing to be performed by the units described below.

The central processor 154 may include a semiconductor integrated circuit including, for example, a central processing unit (CPU), a read only memory (ROM), and a RAM. The ROM may store information such as a program. The RAM may serve as a work area. The central processor 154 may control the unit such as the interface 150 or the data storage 152 via a system bus 156. In the example embodiment, the central processor 154 may also serve as a position calculator 170, a road surface determination unit 172, a three-dimensional object determination unit 174, and an identification object identifying unit 176. In the following, a vehicle external environment recognition method is described in detail also with reference to operation of each unit of the central processor 154.

[Vehicle External Environment Recognition Method]

Figure 3:
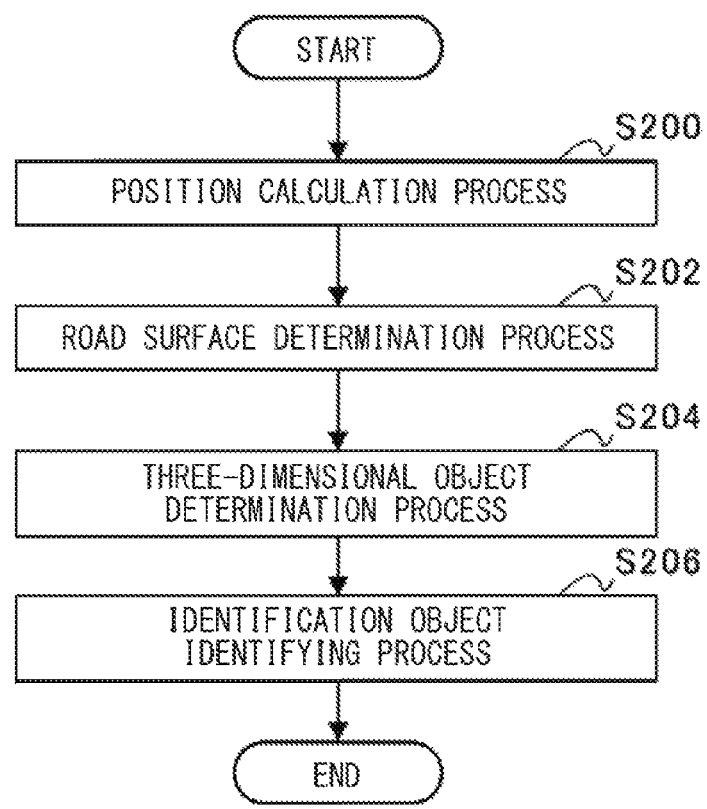
FIG. 3 is a flowchart illustrating an example of a flow of processes in a vehicle external environment recognition method.

FIG. 3 is a flowchart illustrating a flow of processes in the vehicle external environment recognition method. The vehicle external environment recognition apparatus 120 may execute the processes in the vehicle external environment recognition method every predetermined interruption time. In the vehicle external environment recognition method, the position calculator 170 may calculate three-dimensional positions of respective blocks in the luminance images acquired from the imaging units 110 (position calculation process S200). The road surface determination unit 172 may determine a road surface region that corresponds to a road surface in the images, to generate a first road surface model and a second road surface model (road surface determination process S202). The three-dimensional object determination unit 174 may group the blocks to put any two or more of the blocks that are positioned vertically upward of the first road surface model and the second surface model in a group and thereby determine three-dimensional objects (three-dimensional object determination process S204). The identification object identifying unit 176 may identify an identification object such as a preceding vehicle on the basis of the three-dimensional objects (identification object identifying process S206).

[Position Calculation Process S200]

Figure 4A:
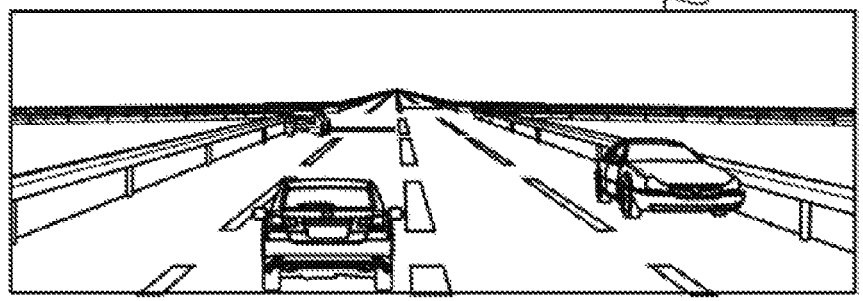
FIGS. 4A to 4C are explanatory diagrams for describing examples of a luminance image and a distance image.
Figure 4B:
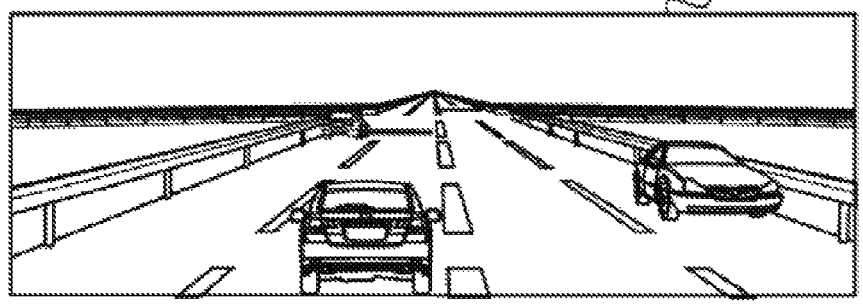
Figure 4C:

FIGS. 4A to 4C are explanatory diagrams for describing the luminance image and the distance image. The position calculator 170 may acquire two or more luminance images that have been captured by the respective imaging units 110 at substantially the same timing with different optical axes. In this example, the position calculator 170 may acquire two luminance images. Assume that the position calculator 170 acquires a first luminance image 212a illustrated in FIG. 4A and a second luminance image 212b illustrated in FIG. 4B as the luminance images 212. The first luminance image 212a may be captured by the imaging unit 110 positioned relatively on the right side of the own vehicle 1. The second luminance image 212b may be captured by the imaging unit 110 positioned relatively on the left side of the own vehicle 1.

Referring to FIGS. 4A and 4B, an image position of the three-dimensional object included in the first luminance image 212a and an image position of the three-dimensional object included in the second luminance image 212b may be different from each other in a horizontal direction because of a difference in imaging position between the imaging units 110. As used herein, the term "horizontal" refers to a lateral direction of the captured image, and the term "vertical" refers to a longitudinal direction of the captured image.

The position calculator 170 may generate a distance image 214 as illustrated in FIG. 4C, on the basis of the first luminance image 212a illustrated in FIG. 4A and the second luminance image 212b illustrated in FIG. 4B. The first luminance image 212a and the second luminance image 212b may be acquired by the position calculator 170. The distance image 214 may allow for determination of a distance from the own vehicle 1 to a captured object.

For example, the position calculator 170 may calculate parallax information including a parallax and an image position by so-called pattern matching. The image position may indicate a position of any block in the image. Further, the position calculator 170 may extract any block from one of the luminance images, e.g., the first luminance image 212a in this example, and search another of the luminance images, e.g., the second luminance image 212b, for a corresponding block to the block extracted. A block may include, for example but not limited to, an array of four pixels horizontally by four pixels vertically. The pattern matching is a method to search one of the luminance images for a block corresponding to any block extracted from another of the luminance images.

Non-limiting examples of a function for evaluating a matching level between blocks in pattern matching may include the sum of absolute differences (SAD) that obtains luminance differences, the sum of squared intensity differences (SSD) that uses squared differences, and the normalized cross correlation (NCC) that obtains similarity of variance obtained by subtracting an average luminance value from the luminance value of each pixel.

The position calculator 170 may perform such a block-based parallax calculation process, for example, for all of the blocks present in the detection region of 600 pixels by 200 pixels. In this example, the position calculator 170 may perform the process on the basis of a block of four pixels by four pixels; however, this is non-limiting. The position calculator 170 may perform the process for any number of pixels.

The position calculator 170 may convert the parallax information for each block in the distance image 214 into a three-dimensional position in real space including a horizontal distance x, a height y, and a relative distance z by a so-called stereo method. In the following, the height y is also referred to as a vertical position y. The stereo method may be a method of calculating the relative distance z of any block with respect to the imaging unit 110 on the basis of a parallax of the block in the distance image 214 by a triangulation method. The position calculator 170 may calculate the height y of the block from a road surface on the basis of: the relative distance z of the block; and a detection distance in the distance image 214 from the block to a point on the road surface having the same relative distance z as the block. Further, the position calculator 170 may associate the calculated three-dimensional position with the distance image 214. The process of calculating the relative distance z and the process of determining the three-dimensional position may use any of various publicly known techniques, and are therefore not described further here.

[Road Surface Determination Process S202]

First, the road surface determination unit 172 may determine a road surface region. The road surface region corresponds to a road surface in the luminance images 212 and the distance image 214.

In one example, the road surface determination unit 172 may determine a road surface in front of the own vehicle 1 on the basis of lane lines located on left and right sides of a lane traveled by the own vehicle 1. Non-limiting examples of the lane lines may include white lines. The road surface determination unit 172 may determine the road surface in front of the own vehicle 1 on the basis of not only the lane lines on the left and right sides of the lane but also three-dimensional objects such as a road marking, a wall, a step provided on a road shoulder, a pole, and a barrier.

Figure 5A:
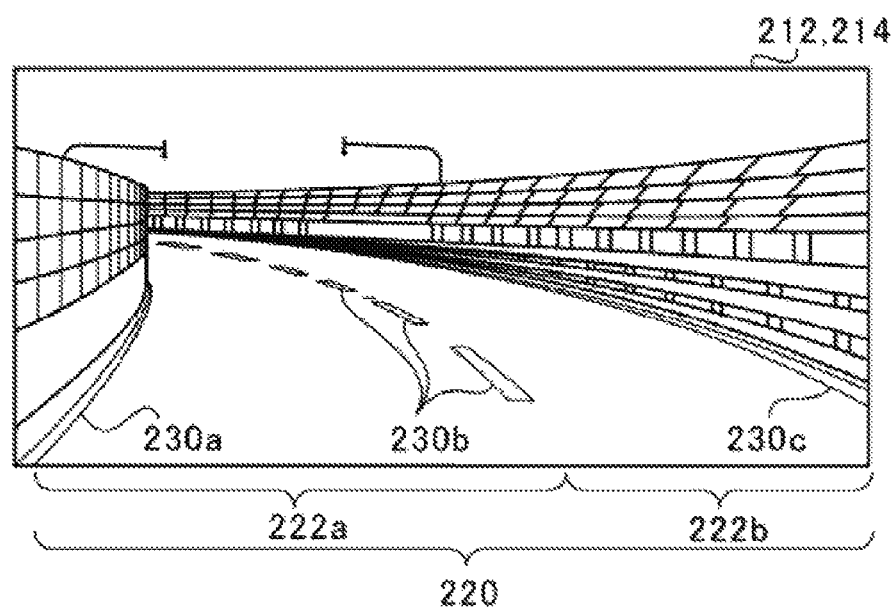
FIGS. 5A and 5B are explanatory diagrams for describing an example of a road surface determination process.
Figure 5B:
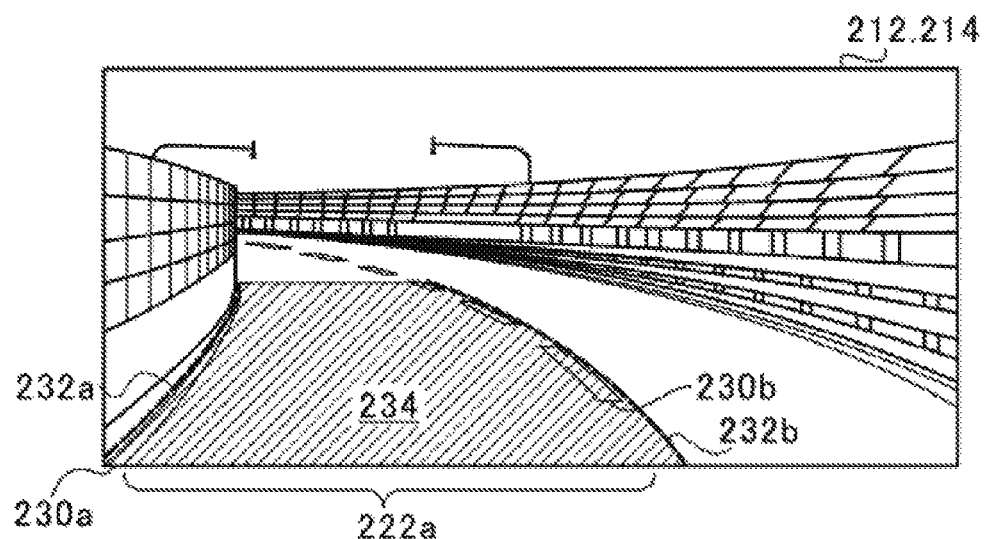

FIGS. 5A and 5B are explanatory diagrams for describing the road surface determination process. On a road surface, lane lines are provided for smooth travel of vehicles. For example, in the example of FIG. 5A, two lanes 222a and 222b are present on a road 220 in the luminance images 212. The two lanes 222a and 222b include three lane lines 230a, 230b, and 230c. The lane line 230b is provided in the widthwise middle of the road 220, and the lane lines 230a and 230c are provided on both sides of the road 220.

As denoted by a broken line in FIG. 5B, the road surface determination unit 172 may set a virtual left limit line 232a, leftward from a left end of the lane line 230a by a predetermined distance, e.g., 10 centimeters. The lane line 230a is located on the left side of the lane 222a traveled by the own vehicle 1. Moreover, as denoted by another broken line, the road surface determination unit 172 may set a virtual right limit line 232b, rightward from a right end of the lane line 230b by a predetermined distance, e.g., 10 centimeters. The lane line 230b is located on the right side of the lane 222a traveled by the own vehicle 1. The road surface determination unit 172 may set a hatched region in FIG. 5B as a road surface region 234. The road surface region 234 is a region rightward from the left limit line 232a and leftward from the right limit line 232b.

Thereafter, the road surface determination unit 172 may extract all blocks in the road surface region 234 whose relative distances are obtained by pattern matching, to generate a road surface model. In the following, a procedure of generation of the road surface model is described.

Figure 6A:
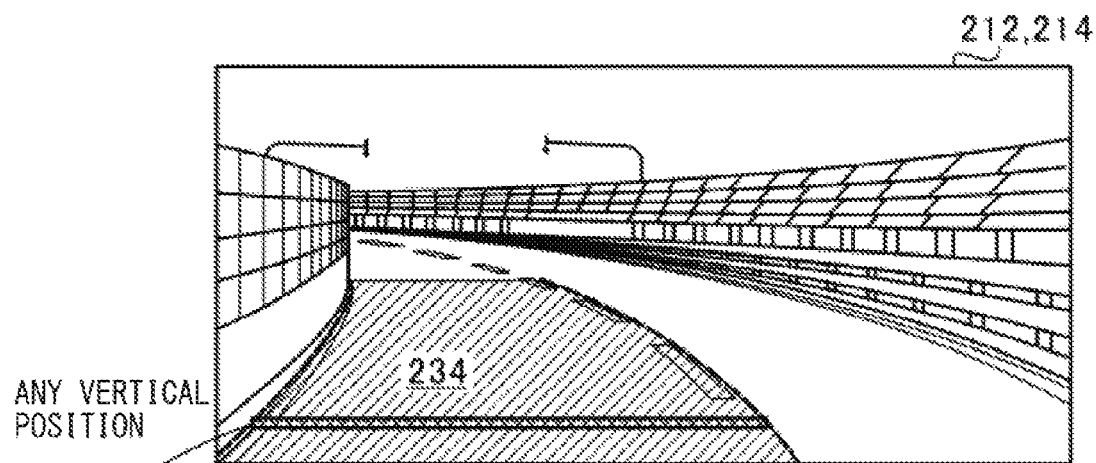
FIGS. 6A and 6B are explanatory diagrams for describing an example of a histogram.
Figure 6B:
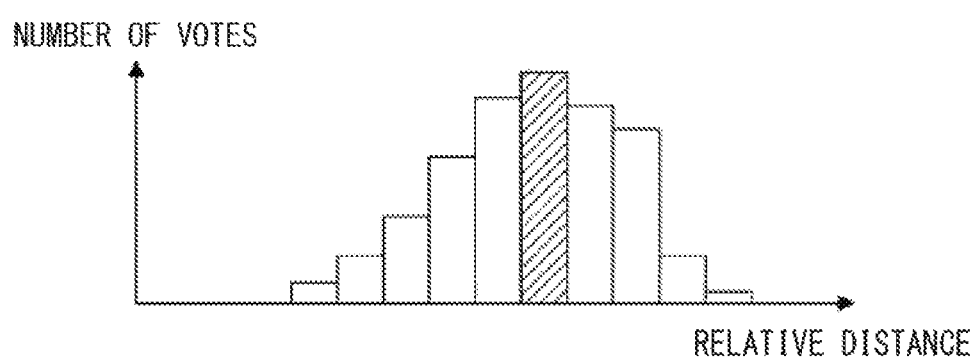

FIGS. 6A and 6B are explanatory diagrams for describing a histogram. FIGS. 7A and 7B, and FIGS. 8A and 8B are explanatory diagrams for describing the road surface model. First, the road surface determination unit 172 may generate a histogram of the relative distance z for a horizontal line extending in the horizontal direction of the road surface region 234. In one example, the road surface determination unit 172 may give votes for the relative distances of respective blocks at an equal vertical position to a block at any vertical position. That is, the road surface determination unit 172 may give votes for the relative distances of all blocks on a horizontal line indicated by cross hatching in FIG. 6A. In this way, as illustrated in FIG. 6B, a histogram is generated for any vertical position.

Thus, the road surface determination unit 172 may set, as a representative distance at the vertical position, the relative distance z indicated by hatching in FIG. 6B having the greatest number of votes in the histogram. The road surface determination unit 172 may sequentially change the vertical position, and calculate the representative distances for all the vertical positions in the road surface region 234.

Figure 7A:
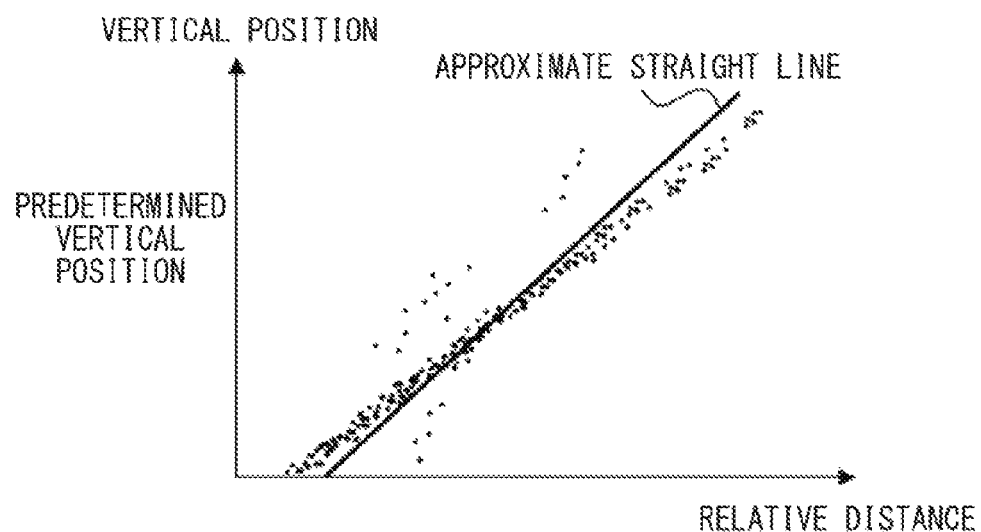
FIGS. 7A and 7B are explanatory diagrams for describing an example of a road surface model.

The road surface model represents a gradient of the road surface region 234 by a y-z plane with a vertical axis denoting the vertical position y and a horizontal axis denoting the relative distance z. The road surface determination unit 172 may plot the representative distance for each vertical position y, at the relevant vertical position y. Thus, the road surface determination unit 172 may obtain a point cloud as illustrated in FIG. 7A. The road surface determination unit 172 may calculate an approximate straight line of the point cloud, as indicated by a solid line in FIG. 7A, by, for example, a least squares method, to form a road surface model 236. In this way, the road surface determination unit 172 may calculate the gradient of the road surface. It is to be noted that for convenience of description, an example is described in which the road surface determination unit 172 calculates the approximate straight line, but the road surface determination unit 172 may calculate a multiple-order approximate curve.

However, such a plot in the road surface region 234 may sometimes include the representative distances that correspond to noise and have been erroneously produced by pattern matching. If the road surface determination unit 172 simply calculates the approximate straight line by, for example, the least squares method, the approximate straight line may deviate from a proper position or inclination due to noise, as illustrated in FIG. 7A.

Figure 7B:
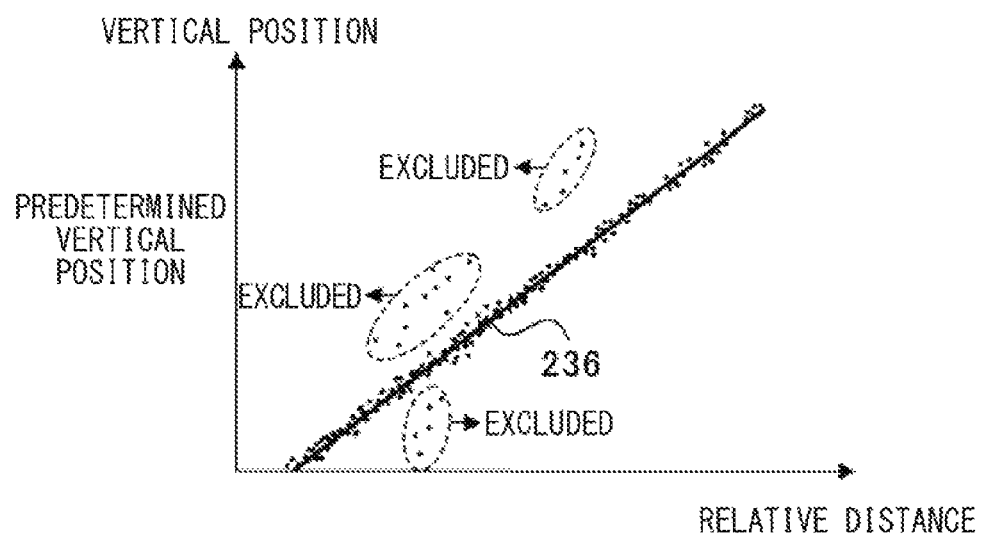

Thus, the road surface determination unit 172 may use a Hough transformation relating to a straight line, to keep solely the representative distances that form the same straight line or form not the same straight line but a parallel straight line within a predetermined relative distance. The road surface determination unit 172 may exclude the other representative distances surrounded by broken lines in FIG. 7B as noise. Thus, the road surface determination unit 172 may calculate the approximate straight line of the point cloud by, for example, the least squares method, targeting solely at the remaining representative distances. Thus, as illustrated in FIG. 7B, the road surface model 236 is calculated that is appropriately approximated by the proper representative distances. It is to be noted that the Hough transformation relating to the straight line is an existing technique of calculating a straight line that passes through a plurality of points commonly, and description thereof is omitted here.

In FIGS. 7A and 7B, description is given of an example in which the gradient of the road surface does not change within the road surface region 234. However, in the road surface region 234, the gradient of the road surface is not necessarily constant but may change midway. In this case, if the road surface determination unit 172 simply performs the Hough transformation, most of the representative distances corresponding to the road surface after a change in the gradient are excluded as noise.

Figure 8A:
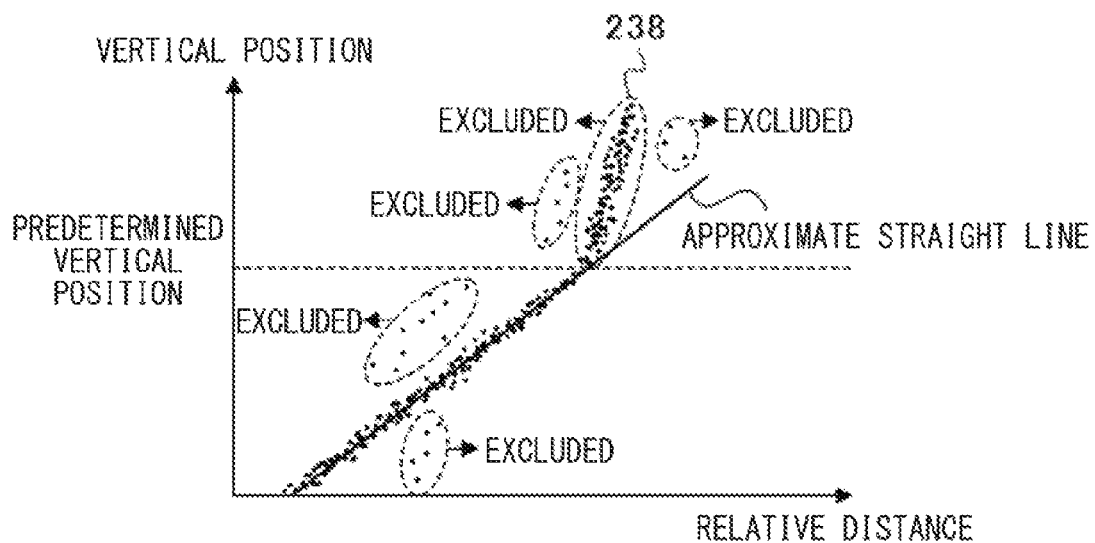
FIGS. 8A and 8B are explanatory diagrams for describing an example of the road surface model.

For example, let us assume that the road surface determination unit 172 obtains the point clouds of the representative distances as illustrated in FIG. 8A. The road surface determination unit 172 may keep solely the representative distances that form the same straight line or form not the same straight line but a parallel straight line within a predetermined relative distance. The road surface determination unit 172 may exclude the other representative distances surrounded by broken lines in FIG. 8A as noise. Thus, the road surface determination unit 172 may calculate the approximate straight line of the point clouds by, for example, the least squares method, targeting solely at the remaining representative distances.

However, out of the representative distances excluded as noise, a point cloud 238 include the predetermined number of points or more, and the point cloud 238 has continuity. Moreover, above a predetermined vertical position, no representative distance is present in the vicinity of the approximate straight line. That is, the point cloud 238 is not noise but indicates a correct road surface having a different gradient.

Thus, in a case where the number of the representative distances excluded by the Hough transformation is equal to or greater than a predetermined value, and the point cloud has continuity, the road surface determination unit 172 may newly calculate an approximate straight line solely for the point cloud 238. In one example, as in FIG. 8B, the road surface determination unit 172 may keep solely the representative distances that form the same straight line or form not the same straight line but a parallel straight line within a predetermined relative distance, in the point cloud 238 located upward of the predetermined vertical position. The road surface determination unit 172 may exclude the other representative distances surrounded by broken lines in FIG. 8B as noise. The road surface determination unit 172 may calculate an approximate straight line of such a point cloud by, for example, the least squares method, targeting solely at the remaining representative distances. In this way, the road surface model 236 having a different gradient may be newly generated.

Figure 8B:
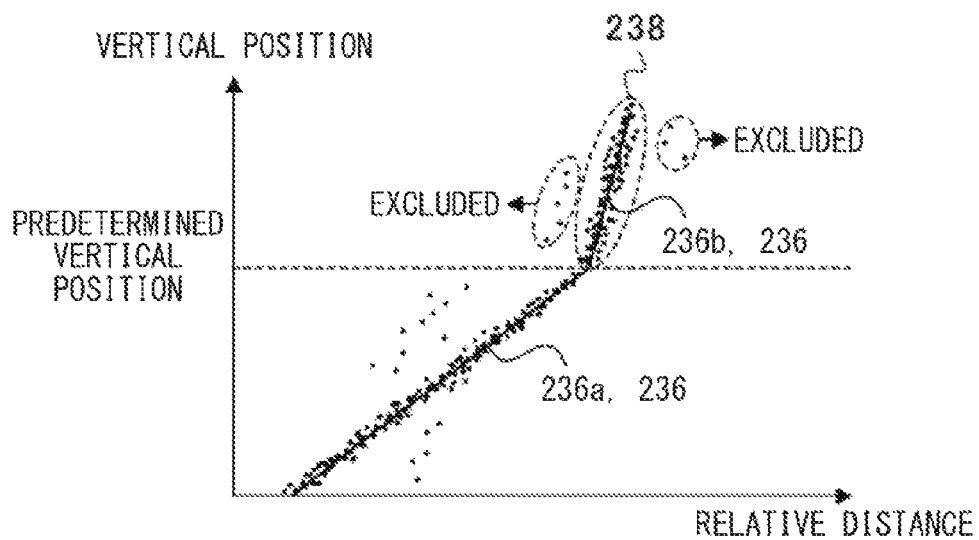

In the following, as illustrated in FIG. 8B, the road surface model 236 having a short relative distance is referred to as a first road surface model 236a. The road surface model 236 that represents a farther portion of the road surface region 234 than the first road surface model 236a and differs in the gradient from the first road surface model 236a is referred to as a second road surface model 236b. The second road surface model 236b has a different gradient from that of the first road surface model 236a, but is continuous with the first road surface model 236a at a predetermined vertical position.

It is to be noted that an intersection of the two approximate straight lines calculated may be assumed to intersect with a predetermined angle. Alternatively, the two approximate straight lines calculated may be assumed to be coupled through a relaxation curve rounded with a predetermined radius R. In addition, the forgoing description is made by giving an example in which the road surface determination unit 172 generates the two approximate straight lines, but the road surface determination unit 172 may generate three or more approximate straight lines in a case with many changes in the road.

[Three-Dimensional Object Determination Process S204]

The three-dimensional object determination unit 174 may group blocks to put any two or more of the blocks that are positioned vertically upward of the first road surface model 236*a* and the second road surface model 236*b* determined by the road surface determination unit 172 in a group and thereby determine a three-dimensional object.

However, there may be cases where the first road surface model 236*a* and the second road surface model 236*b* determined by the road surface determination unit 172 do not appropriately represent the road surface. In such cases, possibility may arise that the three-dimensional object determination unit 174 fails in extracting a three-dimensional object that is supposed to be present.

Figure 9:
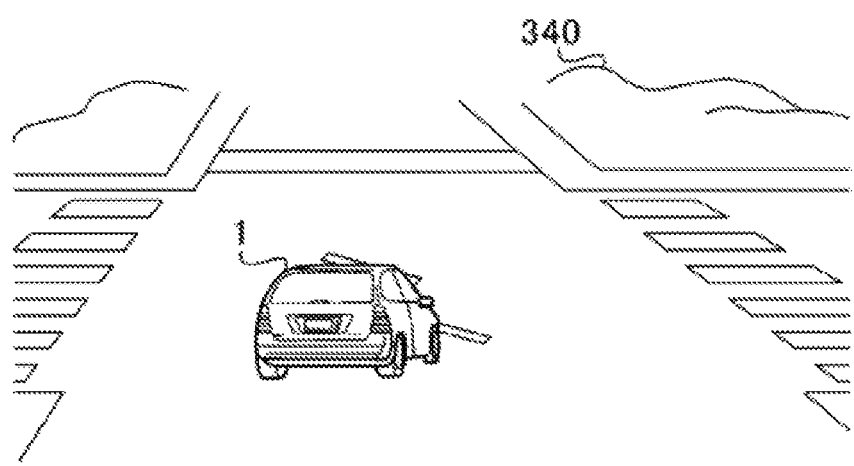
FIG. 9 is an explanatory diagram for describing an example of a three-dimensional object determination process.

FIGS. 9, 10A, 10B, 11A, and 11B are explanatory diagrams for describing the three-dimensional object determination process. Let us assume a case with snow cover. As illustrated in FIG. 9, snow 340 is stacked beside an intersection to form a low inclined wall. If the own vehicle 1 tries to turn to the right at the intersection, the accumulated snow 340 is positioned in front of the own vehicle 1.

In the example of FIG. 9, possibility is that the road surface determination unit 172 may misrecognize the low inclined wall of the accumulated snow 340 as a road surface. In this case, the road surface determination unit 172 may calculate the first road surface model 236*a* on the basis of the actual road surface located in front of the own vehicle 1, and calculate the second road surface model 236*b* on the basis of the low inclined wall of the accumulated snow 340. This causes the three-dimensional object determination unit 174 to fail in extracting a three-dimensional object that is actually positioned vertically upward of the road surface but falls vertically below the second road surface model 236*b*.

Figure 10A:
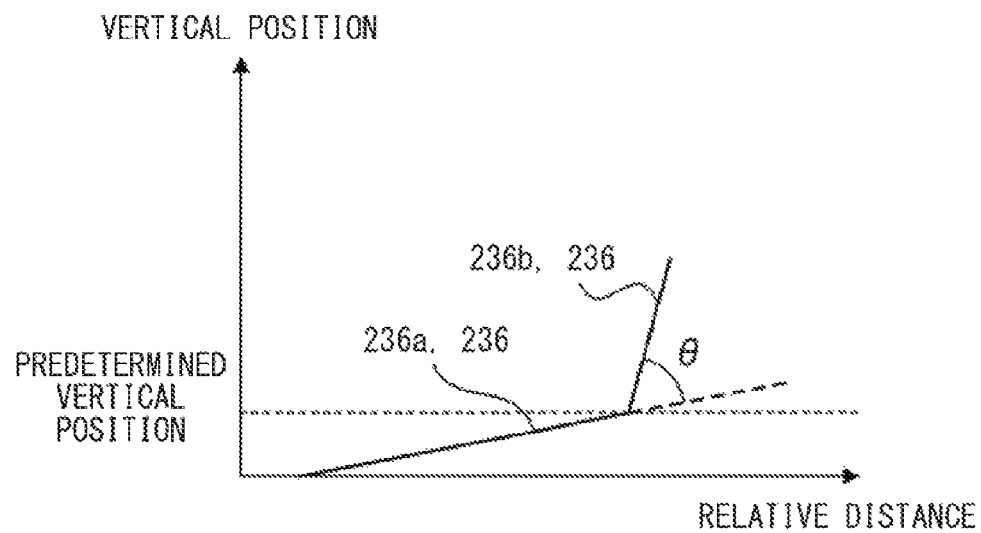
FIGS. 10A and 10B are explanatory diagrams for describing an example of the three-dimensional object determination process.
Figure 10B:
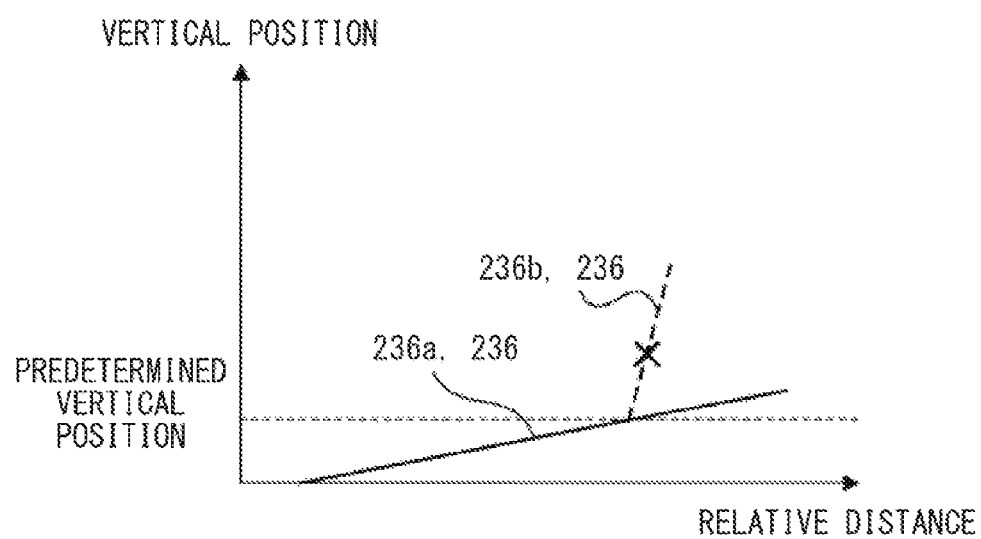

Thus, in a case where an angle formed by the first road surface model 236*a* and the second road surface model 236*b* is equal to or greater than a predetermined angle, the three-dimensional object determination unit 174 extends far the first road surface model 236*a*. In one example, as illustrated in FIG. 10A, the three-dimensional object determination unit 174 may calculate an angle θ formed by an extension of the first road surface model 236*a* and the second road surface model 236*b*. In a case where the angle θ is equal to or greater than a predetermined angle, e.g., 35°, the three-dimensional object determination unit 174 may cancel the second road surface model 236*b* without adopting the second road surface model 236*b*, and extend far the first road surface model 236*a*, as illustrated in FIG. 10B. The three-dimensional object determination unit 174 may group blocks to put any two or more of the blocks that are positioned vertically upward of the extended first road surface model 236*a* in a group and thereby determine a three-dimensional object.

However, depending on roads to be traveled, there are situations where the own vehicle 1 climbs a hill immediately after going down a hill. In this case, a gradient of each of a downhill road surface and a uphill road surface is small. However, when the downhill road surface and the uphill road surface are continuous, the angle θ formed by the first road surface model 236*a* indicating the downhill road surface and the second road surface model 236*b* indicating the uphill road surface may possibly become equal to or greater than the predetermined angle while the own vehicle 1 is traveling on the downhill road surface. In this case, the three-dimensional object determination unit 174 may possibly cancel the road surface model representing the uphill road surface that should be determined as a road surface.

Figure 11A:
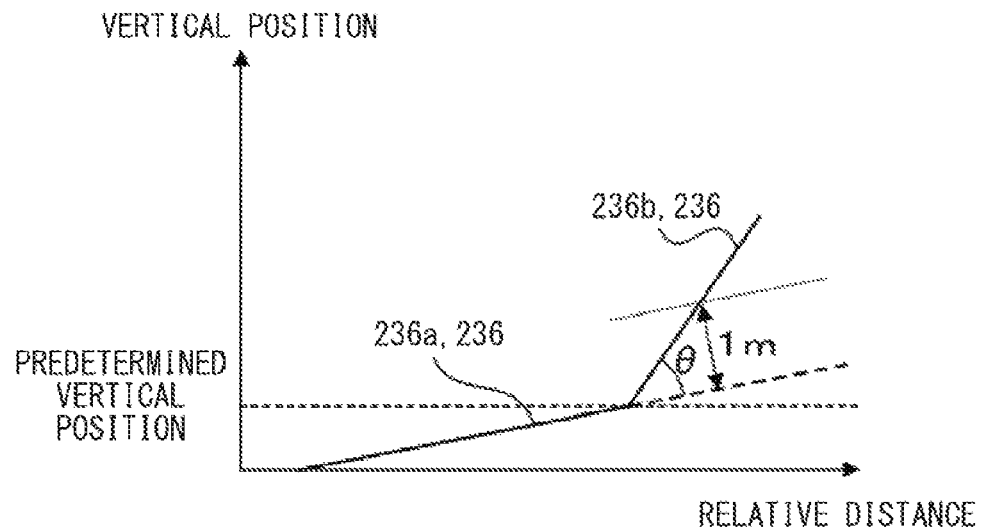
FIGS. 11A and 11B are explanatory diagrams for describing an example of the three-dimensional object determination process.
Figure 11B:
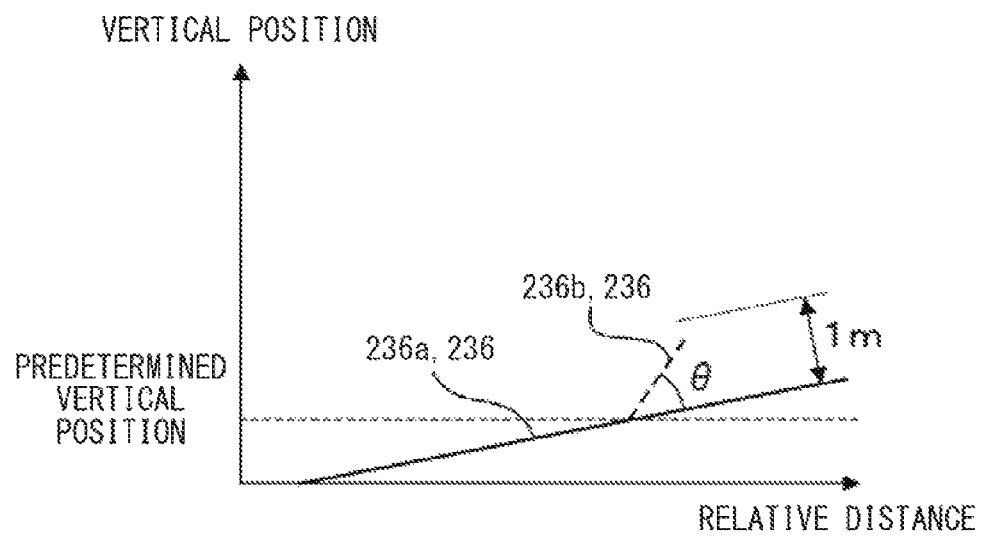

Thus, even in a case where the angle formed by the first road surface model 236*a* and the second road surface model 236*b* is equal to or greater than the predetermined angle, when a height of the second road surface model 236*b* with respect to the extension of the first road surface model 236*a* is equal to or greater than a predetermined height, the three-dimensional object determination unit 174 may adopt the second road surface model 236*b* as it is. The height of the second road surface model 236*b* is represented by a length of a vertical line with respect to the extension of the first road surface model 236*a*. The condition as mentioned above is not limited to a case where the height at an end portion of the second road surface model 236*b* is equal to or greater than the predetermined height. It suffices the height at any portion of the second road surface model 236*b* is equal to or greater than the predetermined height. In one example, as illustrated in FIG. 11A, even in a case where the angle θ formed by the extension of the first road surface model 236*a* and the second road surface model 236*b* is equal to or greater than the predetermined angle, e.g., 35°, when the height of the second road surface model 236*b* is equal to or greater than the predetermined height, e.g., 1 meter, the three-dimensional object determination unit 174 may adopt the second road surface model 236*b* as it is without canceling the second road surface model 236*b*. In the meanwhile, as illustrated in FIG. 11B, in a case where the angle θ formed by the first road surface model 236*a* and the second road surface model 236*b* is equal to or greater than the predetermined angle and the height of the second road surface model 236*b* is smaller than the predetermined height, e.g., 1 meter, the three-dimensional object determination unit 174 may cancel the second road surface model 236*b* and extend far the first road surface model 236*a*.

With such a configuration, it is possible for the three-dimensional object determination unit 174 to determine the road surface appropriately, leading to accurate determination of three-dimensional objects.

Thereafter, the three-dimensional object determination unit 174 may group the blocks in such a manner as to put any two or more blocks that are positioned upward of the road surface model 236 thus calculated, have the same color value, and have a difference in the three-dimensional positions in the distance image 214 falling within a predetermined range in a group, and thereby determine three-dimensional objects. For example, the three-dimensional object determination unit 174 may group the blocks assuming that any two or more blocks that have a difference in the horizontal distance x, a difference in the height y, and a difference between the relative distance z falling within a predetermined range, e.g., 0.1 meter, belong to the identical identification object. Thus, the three-dimensional object determination unit 174 may generate virtual block groups.

Figure 12A:
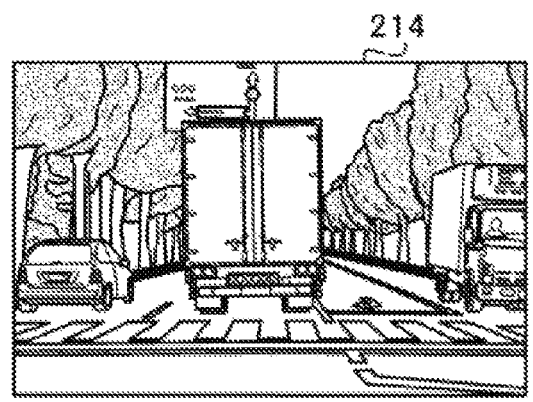
FIGS. 12A to 12C are explanatory diagrams for describing an example of the three-dimensional object determination process.
Figure 12B:
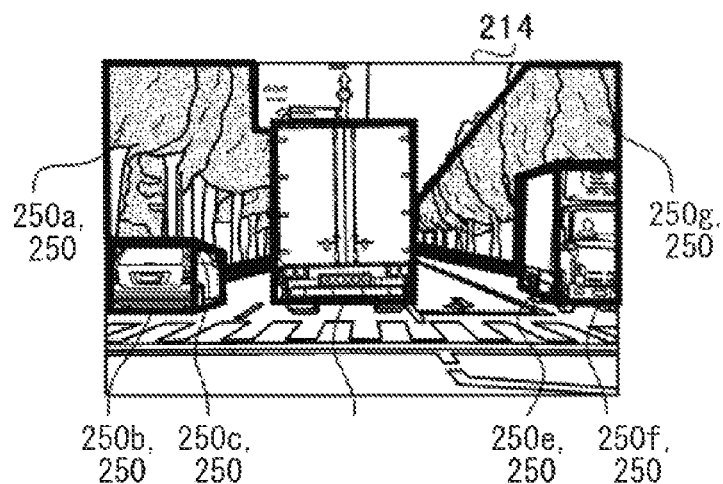
Figure 12C:
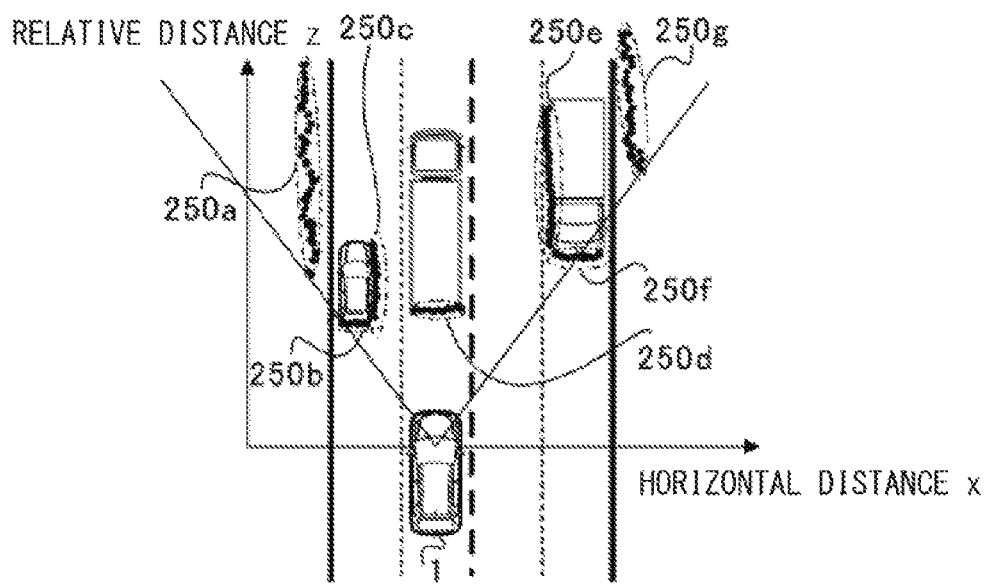

FIGS. 12A to 12C are explanatory diagrams for describing the three-dimensional object determination process. Let us assume an example case where the position calculator 170 has generated the distance image 214 as illustrated in FIG. 12A. The three-dimensional object determination unit 174 may group the blocks on the basis of such a distance image 214. As a result, block groups based on such grouping may be extracted as illustrated in FIG. 12B. The three-dimensional object determination unit 174 may set an out-line including all the blocks in the group as a three-dimensional object 250 in FIG. 12B. For example, the three-dimensional object determination unit 174 may set a rectangular frame or a rectangular surface formed by horizontal lines and vertical lines or by lines extending in a depthwise direction and vertical lines as the three-dimensional object 250. Thus, the three-dimensional object determination unit 174 may determine three-dimensional objects 250a, 250b, 250c, 250d, 250e, 250f, and 250g illustrated in FIG. 12B.

The three-dimensional objects 250a, 250b, 250c, 250d, 250e, 250f, and 250g in the distance image 214 in FIG. 12B may be translated onto a two-dimensional horizontal plane represented by the horizontal distance x and the relative distance z as the three-dimensional objects 250a, 250b, 250c, 250d, 250e, 250f, and 250g illustrated in FIG. 12C.

[Identification Object Identifying Process S206]

The identification object identifying unit 176 may determine which identification object the three-dimensional object determined by the three-dimensional object determination unit 174 is. For example, the identification object identifying unit 176 may identify the three-dimensional object that is traveling in substantially the same direction as the own vehicle 1 in front of the own vehicle 1 as a preceding vehicle.

For example, the three-dimensional object determination unit 174 may determine the three-dimensional object 250b and the three-dimensional object 250c as different three-dimensional objects in FIG. 12C. However, in fact, the three-dimensional object 250b corresponds to a rear surface of the preceding vehicle and the three-dimensional object 250c corresponds to a side surface of the preceding vehicle. Therefore, the three-dimensional object 250b and the three-dimensional object 250c should be recognized as a pair of portions included in the one identical three-dimensional object. Similarly, the three-dimensional object 250e and the three-dimensional object 250f should be recognized as the identical three-dimensional object. Accordingly, the identification object identifying unit 176 may pair the three-dimensional objects 250 which are the rear surface and the side surface of the identical three-dimensional object.

For example, the identification object identifying unit 176 may determine whether or not a pair of the three-dimensional object 250h corresponding to the rear surface and the three-dimensional object 250i corresponding to the side surface satisfies a condition for a preceding vehicle. For example, the identification object identifying unit 176 may determine whether the three-dimensional object including the pair of the three-dimensional object 250h and the three-dimensional object 250i has a size appropriate as a vehicle, a shape appropriate as a vehicle, a relative speed appropriate as a vehicle, and a light emission source provided at a predetermined position on the rear side. Non-limiting examples of the light emission source may include a brake lamp and a high mount stop lamp. In a case where such a condition is satisfied, the identification object identifying unit 176 may identify the three-dimensional object 250 including the pair of the three-dimensional object 250h and the three-dimensional object 250i as the preceding vehicle.

Further, the identification object identifying unit 176 may identify a three-dimensional object that stands on the side of the road in front of the own vehicle 1 as a sidewall. For example, referring to FIG. 12C, the identification object identifying unit 176 may identify the three-dimensional object 250a that stands on the left side of the road as a left sidewall. The identification object identifying unit 176 may identify the three-dimensional object 250g that stands on the right side of the road as a right sidewall.

As described, in the embodiment, it is possible to determine the road surface appropriately. Hence, it is possible to identify an identification object accurately.

In addition, a program that causes a computer to serve as the vehicle external environment recognition apparatus 120, and a computer-readable storage medium in which the program is recorded may be also provided. In this example, the program may be adapted for data processing and may be written in any language or any description method. Non-limiting examples of the computer-readable storage medium may include a flexible disk, a magneto-optical disk, a ROM, a compact disc (CD), a digital versatile disc (DVD), and a Blu-ray Disc (BD, registered trademark).

Although some example embodiments of the technology have been described in the forgoing byway of example with reference to the accompanying drawings, the technology is by no means limited to the example embodiments described above. It should be appreciated that modifications and alterations may be made by persons skilled in the art without departing from the scope as defined by the appended claims. The use of the terms first, second, etc. does not denote any order or importance, but rather the terms first, second, etc. are used to distinguish one element from another. The technology is intended to include such modifications and alterations in so far as they fall within the scope of the appended claims or the equivalents thereof.

It is to be noted that processes of the vehicle external environment recognition method described herein are not necessarily executed in time series in the order described in the flowchart. In one example, the processes may be executed in parallel. In another example, a sub-routine process may be additionally provided.

Each of the vehicle external environment recognition apparatus 120, the central processor 154, the position calculator 170, the road surface determination unit 172, the three-dimensional object determination unit 174, and the identification object identifying unit 176 illustrated in FIG. 2 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or apart of functions of each of the vehicle external environment recognition apparatus 120, the central processor 154, the position calculator 170, the road surface determination unit 172, the three-dimensional object determination unit 174, and the identification object identifying unit 176 illustrated in FIG. 2. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of each of the vehicle external environment recognition apparatus 120, the central processor 154, the position calculator 170, the road surface determination unit 172, the three-dimensional object determination unit 174, and the identification object identifying unit 176 illustrated in FIG. 2.

The invention claimed is:

1. A vehicle external environment recognition apparatus to be applied to a vehicle, the vehicle external environment recognition apparatus comprising:
   a road surface determination processor configured to determine a road surface region that corresponds to a road surface in an image, plot representative distances of respective horizontal lines in the road surface region at respective vertical positions of the horizontal lines, and generate a first road surface model and a second road surface model, the second road surface model representing a farther portion of the road surface region from the vehicle than the first road surface model and differing in a gradient from the first road surface model; and
   a three-dimensional object determination processor configured to group blocks to put any two or more of the blocks that are positioned vertically upward of the first road surface model and the second surface model in a group and thereby determine a three-dimensional object, wherein
   on a condition that an angle formed by the first road surface model and the second road surface model is greater than a predetermined angle, the three-dimensional object determination processor is configured to cancel the second road surface model and extend far the first road surface model.

2. The vehicle external environment recognition apparatus according to claim 1, wherein
   on a condition that the angle formed by the first road surface model and the second road surface model is greater than the predetermined angle and a height of the second road surface model is lower than a predetermined height, the three-dimensional object determination processor is configured to cancel the second road surface model and extends far the first road surface model.

3. A vehicle external environment recognition apparatus to be applied to a vehicle, the vehicle external environment recognition apparatus, comprising
   circuitry configured to:
      determine a road surface region that corresponds to a road surface in an image, plot representative distances of respective horizontal lines in the road surface region at respective vertical positions of the horizontal lines, and generate a first road surface model and a second road surface model, the second road surface model representing a farther portion of the road surface region from the vehicle than the first road surface model and differing in a gradient from the first road surface model; and
      group blocks to put any two or more of the blocks that are positioned vertically upward of the first road surface model and the second surface model in a group and thereby determine a three-dimensional object, wherein
   on a condition that an angle formed by the first road surface model and the second road surface model is greater than a predetermined angle, the circuitry is configured to cancel the second road surface model and extend far the first road surface model.

* * * * *